United States Patent
Raaf et al.

(10) Patent No.: US 6,301,235 B1
(45) Date of Patent: Oct. 9, 2001

(54) TERMINAL FOR DIGITAL MOBILE RADIO AND METHOD FOR EVALUATING DATA RECEIVED IN SUCH A TERMINAL

(75) Inventors: Bernhard Raaf, München; Jan Meyer, Weilheim, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/426,416

(22) Filed: Oct. 25, 1999

Related U.S. Application Data

(63) Continuation of application No. PCT/DE98/01101, filed on Apr. 20, 1998.

(51) Int. Cl.[7] .................................................. H04Q 7/00
(52) U.S. Cl. ........................................... 370/332; 370/311
(58) Field of Search ................................ 370/311, 328, 370/317, 332, 336, 345; 455/343, 574; 371/2.1

(56) References Cited

U.S. PATENT DOCUMENTS

| | | | |
|---|---|---|---|
| 5,384,782 | * | 1/1995 | Elms ...................................... 371/2.1 |
| 5,499,246 | * | 3/1996 | Cooper .................................. 370/345 |
| 5,566,366 | * | 10/1996 | Russo et al. ......................... 455/343 |
| 5,570,369 | | 10/1996 | Jokinen . |
| 6,046,990 | * | 4/2000 | Chennakeshu et al. ............. 370/317 |

FOREIGN PATENT DOCUMENTS 0 673 175 A2    9/1995  (EP) .

OTHER PUBLICATIONS

International Publication No. WO 96/11556 (Holcman), dated Apr. 18, 1996.
International Publication No. WO 96/37051 (Priest), dated Nov. 21, 1996.
International Publication No. WO 94/27377 (Croft et al.), dated Nov. 24, 1994.
International Publication No. WO 97/20446 (Raith), dated Jun. 5, 1997.
International Publication No. WO 94/08432 (Raith), dated Apr. 14, 1994.

* cited by examiner

*Primary Examiner*—Salvatore Cangialosi
(74) *Attorney, Agent, or Firm*—Herbert L. Lerner; Laurence A. Greenberg; Werner H. Stemer

(57) ABSTRACT

A terminal and a method for a digital mobile radio system having a receiving device for receiving digital data packets, and having a decision device which before complete reception of an information unit, which comprises one or more data packets, uses a part of the information unit which has already been received to determine whether the information unit is or is not important. If it is determined that the information unit is not important, the decision device causes the receiving unit to ignore the rest of the information unit.

20 Claims, 1 Drawing Sheet

TERMINAL FOR DIGITAL MOBILE RADIO AND METHOD FOR EVALUATING DATA RECEIVED IN SUCH A TERMINAL

CROSS-REFERENCE TO RELATED APPLICATION

This is a continuation of copending International application PCT/DE98/01101, filed Apr. 20, 1998, which designated the United States.

BACKGROUND OF THE INVENTION

FIELD OF THE INVENTION

The present invention relates, in general, to digital mobile radio systems, and in particular, to a terminal for a digital mobile radio system and to a method for evaluating received data in a terminal for a digital mobile radio system, which offers the capability to reduce the power consumption when receiving information which is not important.

As a rule, time-division multiplexing methods are used for transmitting data in digital mobile radio systems. In this case, the bandwidth which is available on a carrier signal transmitted between base stations and mobile stations is subdivided in time between the various subscribers. Time-division multiplexing and frequency-division multiplexing methods are frequently combined in such a manner that there are a number of carrier frequencies, which are then each accessed separately using the time-division multiplexing method. Thus, for example, in the GSM system (Global System for Mobile Communications), carrier frequencies with a spacing of 200 kHz from one another are used, which are subdivided into eight time slots or data packets. In this case, data is frequently transmitted to the mobile stations from the base stations which is important for only a single one of the mobile stations, or for none of them. However, conversely, this can also relate to data packets which are sent from a mobile station to a base station. Data packets which are not important may in this case be data packets which contain so-called dummy data or filling data, but they may also be data packets which contain information that does not relate, or no longer relates, to the received terminal since, for example, the terminal has already received it once. In the prior art, all of the transmitted data is received by the receiving terminal and is processed irrespective of whether the data is or is not required by the terminal. This results in increased power consumption in the terminal which is disadvantageous, particularly for mobile stations powered by batteries such as rechargeable batteries.

Published international patent application, WO 96/37051 discloses a method and an apparatus for saving power in portable battery-powered radio appliances. In this case, a received message is compared with a previous received message. If the two messages match, the radio appliance is switched to a power saving mode, in which the message received later is not processed any further. Published international patent application, WO 94/08432 discloses a method for transmitting information between a base station and a mobile station in a digital control channel of a telecommunications system. In this case, the base station transmits change characters which indicate whether successive messages differ. The mobile station processes received messages only if a previous change character indicates a change in comparison to the previous messages. Published international patent application, Wo 94/27377 discloses a mobile station for a mobile radio system, having a receiving device for receiving digital data packets and for providing soft decision values for received data packets, and having a decision device which, before complete reception of an information unit comprising one or more data packets, uses a part of the information unit which has already been received to decide whether the information unit is or is not important and, if the decision is that the information unit is not important, causes the receiving device to ignore the rest of the information unit. In this case, the soft-decision values are used to determine whether a received data packet is or is not free of errors. If the data packet is free of errors, a power saving signal is produced.

The received data packet is furthermore compared with expected or predetermined data in order to determine whether the data packet contains information which is or is not important for the mobile station. If the information is not important, the mobile station is switched to a power saving mode, in which the rest of the received data packets are not processed any further.

SUMMARY OF THE INVENTION

It is accordingly an object of the invention to provide a terminal for a digital mobile radio system, which overcomes the hereinafore-mentioned disadvantageous of the prior art and which, specifically provides a simpler and more efficient option for saving power.

With the foregoing and other objects in view there is provided, in accordance with the invention, a terminal for a mobile digital radio system, that includes a receiver and a decision device. The receiver is for receiving an information unit including one or more data packets, where at least one of the one or more data packets including soft-decision values. The receiver is programmed to initially receive only a portion of the information unit. The decision device is programmed to use the soft-decision values to calculate a probability value indicative of whether it is important to receive an additional portion of the information unit, programmed to determine whether it is important to receive the additional portion of the information unit by comparing the probability value with a predetermined threshold, and programmed to provide a signal such that the receiver does not receive the additional portion of the information unit if it is determined that it is not important to receive the additional portion of the information unit.

The terminal does not wait until an information unit has been received completely, but an evaluation is carried out at an early stage on the basis of an already received part of an information unit to determine whether the transmitted information unit is or is not important for the relevant terminal. If the information unit is not important for the relevant terminal, then reception of the rest of the information unit is terminated. The rest of an information unit which has been identified as not being important thus may not be received or subsequently processed, and this results in a considerable reduction of the power consumption in the terminal. The terminal may be in a base station or a mobile station. Particularly in the case of a mobile station powered by batteries or rechargeable batteries, the reduced power consumption enabled by the invention provides an important advantage. Furthermore, the present invention is independent of the system in which the data is transmitted. For example, the present invention is just as applicable to the GSM system as to the DECT system (Digital European Cordless Telephone), with the time-division multiplexing method being used to transmit digital data in both systems. In the time-division multiplexing method, the data is transmitted in so-called time slots, which each contain one data packet. In the GSM system, each time frame contains eight time slots or data packets, while in the DECT system, twelve time slots or data packets are in each case provided for transmission and reception per frame.

The present invention enables information units including one or more data packets to be ignored after reception of only a part of the information unit, if the information unit is identified as not being important. In this case, a decision can be made after receiving just one data packet or a part of a data packet as to whether the associated information unit is or is not important.

For example, a signaling channel, or, in other words, an information unit containing signaling data, is provided in the GSM system, which is transmitted to the mobile stations from a base station several times per second. The signaling information unit is in this case distributed over four time slots. In each case one time slot is transmitted in one of four time frames which follow one another, that is to say the information unit is transmitted in blocks separated in time. Even after the first of four data packets is received, the present invention makes it possible to avoid receiving and thus processing the remaining three data packets, if the information unit is identified as not being important on the basis of the first received data packet.

In this case, for the purposes of the invention, not important means all information units which contain data which are irrelevant for the receiving terminal or are not required, or are no longer required, by it. Such data may be, for example, information units containing dummy data or filling data which are transmitted, for example, by a mobile station, whenever no call need be switched and, thus, no data need be transmitted in the signaling channel. Furthermore, information units which are not important may relate to data which has already been received by the receiving terminal, but is not required once again. Information units which are not important can be data which does not relate to the receiving terminal, but only relates to other terminals.

The decision as to whether the information unit is or is not important can, in this case, be made using a probability value which is calculated from the soft-decision values of the already received part of the information unit. Soft-decision values of a digital signal are provided by an equalizer in the receiving device of terminals and contain information about the statistical confidence of the transmitted digital value. In other words, the soft-decision value of a received digital signal indicates a probability value as to whether the digital signal has been transmitted correctly. Thus, a probability value is calculated by means of the soft-decision values of the already received part of the information unit, these values being a measure of the correctness of the received data. This probability value is used as a basis for the decision as to whether the information unit is or is not identified as not being important. If, as a result of this, there is a sufficiently high probability that the information unit is not important, the decision is made that the rest of the information unit should be ignored. The quality information relating to the already received part is thus used, so to speak, to calculate a probability that the information unit is not important.

In accordance with an another feature of the invention, the terminal is preferably operated in the GSM system. The information unit is in this case transmitted in a transmission channel for signaling data, in which case information data which are not important are filling data or signaling data which are not required, or are no longer required, in the terminal.

In accordance with an additional feature of the invention, the decision as to whether the information unit is or is not important is made by evaluating the information content of the already received part of the information unit and by comparing this information content with information stored in a memory device in the terminal. Specific parts, for example, bits of the information unit, may in each case be considered in this case, whose information content is defined and, for example, specifies the length of the information unit or the format of the information unit. This is particularly suitable in those cases in which the transmitted data is coded using a coding method in which the wanted bits, for example the signaling bits, influence only a certain, relatively tightly localized, portion, of all the coded bits transmitted. One example of this is the convolutional code used in the GSM system in which one wanted bit influences approximately eight coded bits.

In accordance with added feature of the invention, the already received part of the information unit is compared with information stored in a memory device in the terminal, in order to decide whether the information unit is or is not important. In contrast to the above-described features of the invention, no evaluation of the information content of the already received part is carried out in this case. The corresponding part of an expected information unit which is not important can, in this case, be stored in a memory, for example. Such an information unit which is not important may comprise, for example, filling data. The filling data transmitted by a specific base station in a frame is normally always the same so that a decision can be made by comparing the already received part of the information unit with the corresponding stored part of the expected information unit which is not important. This is particularly suitable in those cases in which the transmitted data is coded using a coding method in which the wanted bits influence a very wide range of the coded bits transmitted. One example of this is the fire code used in the GSM system, in which one wanted bit influences up to 80 coded bits. This feature is, however, predicated on the expected information unit which is not important being known completely from the start, that is to say being completely specified.

In accordance with a further feature of the invention, a part of a previously received information unit is temporarily stored in a memory device in the terminal and is compared with the received part of a current information unit in order to decide whether the current information unit is or is not important. Thus, if an expected information unit or parts thereof which is not important is not known or specified accurately, a previously received information unit, or a part of it, is stored temporarily. The previously received information unit may in this case have been assessed or identified as not being important after complete reception and complete decoding in the terminal, for example, or it may have become unimportant subsequently. This may relate to repetitions of already received information units which the terminal no longer requires, for example, signaling data which has already been received and evaluated. For example, in GSM systems, base stations transmit requests to set up a connection (paging requests) more than just once, in order to ensure a higher probability of accessibility. If a mobile station has already received and evaluated such a request, then the corresponding information can be stored in the temporary memory, in order to avoid receiving the same data once again.

In accordance with a further added feature of the invention, the already received part of the information unit contains information as to whether the information unit is or is not important, and the terminal evaluates this information in order to make the appropriate decision. For example, the already received part of the information unit may contain information as to whether the information unit contains filling data or wanted data, for example signaling data. In the GSM system, the so-called stealing flags of some signaling channel other than the FACCH channel are preferably used for this purpose, which in each case make up two bits per data packet. This may be, for example, the CCCH channel (Common Control Channel). Thus, with this feature, it is possible to determine immediately after detecting the stealing flags whether the information unit is or is not important, and the receiver can be switched off even while the rest of the data packet is being transmitted.

With the foregoing and other objects in view there is provided, in accordance with the invention, a method for evaluating data for reception in a terminal of a mobile digital radio system, which includes steps of: providing an information unit that includes one or more data packets; providing at least one of the one or more data packets with soft decision values; receiving a portion of the information unit; calculating, using the soft decision values, a probability value indicative of whether it is important to receive an additional portion of the information unit; and determining whether it is important to receive the additional portion of the information unit by comparing the probability value with a predetermined threshold.

With the foregoing and other objects in view there is provided, in accordance with the invention, a method for evaluating data for reception in a terminal of a mobile digital radio system, which includes steps of: providing a terminal; storing predetermined information in the terminal; providing an information unit that includes one or more data packets, and providing the information unit with an information content; receiving a portion of the information unit with the terminal and defining the portion of the information unit as a received portion of the information unit; obtaining the information content of the received portion of the information unit; and determining whether it is important to receive an additional portion of the information unit by comparing the information content of the received portion of the information unit with the predetermined information.

In accordance with a concomitant feature of the invention there is provided a method for evaluating data for reception in a terminal of a mobile digital radio system, which includes steps of: providing an information unit that includes one or more data packets, and providing the information unit with a portion having information relating to whether the information unit is important; receiving the portion of the information unit having information relating to whether the information unit is important; and determining whether it is desirable to receive an additional portion of the information unit by evaluating the received information relating to whether the information unit is important.

Other features which are considered as characteristic for the invention are set forth in the appended claims.

Although the invention is illustrated and described herein as embodied in terminal for digital mobile radio, and method for evaluating data received in such a terminal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
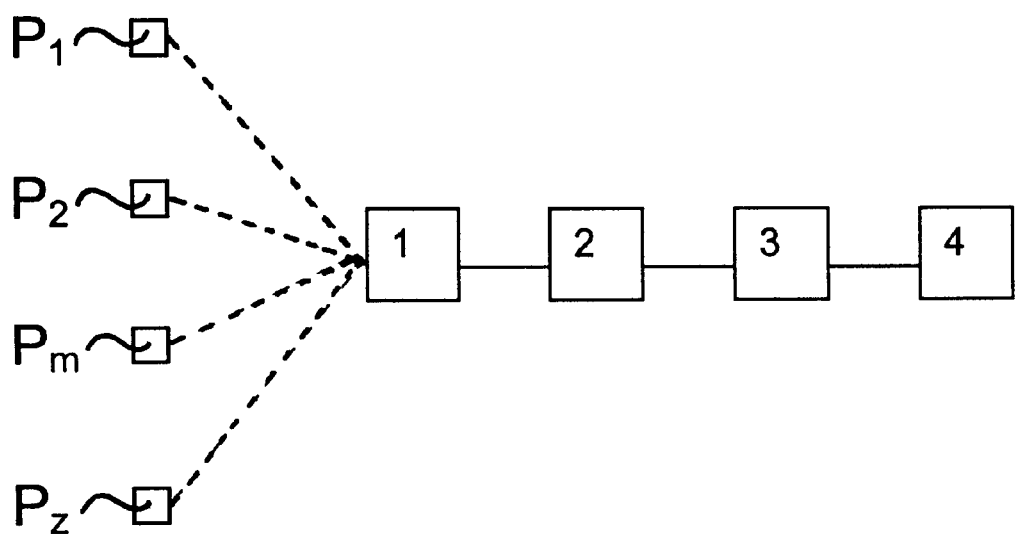
FIG. 1 shows a terminal for a digital mobile radio system.

Referring now to the FIGURE of the drawing, there is seen a terminal T for a digital mobile radio system. The terminal T includes a receiving device 1 and a decision device 2, to which a de-interleaver 3 and a channel decoder 4 are connected. The illustrated elements are arranged in the receiver of the terminal T in which case, of course, the terminal T contains other elements for processing the received data as well as a transmitter etc., although these are of no further importance to the present invention.

The transmitter, from which the terminal T receives data, includes, inter alia, a channel coder, an interleaver and a transmission device. The transmitter may be, for example, in a base station, while the terminal T may be, for example, in a mobile station. However, the terminal T may also be in a base station, and the transmitter may also be in a mobile station. In the channel coder, the data to be transmitted is coded, for example, by a block code or a convolution code. The coded data received in the terminal T are decoded appropriately in the channel decoder 4. The data to be transmitted are reorganized and spread in time in the interleaver of the transmitter in order, if necessary, to randomly distribute errors contained in the data, since most block codes or convolution codes can suppress only statistically independent individual errors. The corresponding reproduction of the order of the received data is carried out in the de-interleaver 3 in the receiving terminal T.

The transmitter, transmits the data using time-division multiplexing, that is to say the data is in each case transmitted in time frames which are subdivided into a specific number of time slots. Each time slot contains a corresponding data packet. As a rule, the data is transmitted at a number of carrier frequencies which are accessed separately using time-division multiplexing so that the transmission takes place by a combination of time-division multiplexing and frequency-division multiplexing methods. The receiving device 1 shown in FIG. 1 thus receives information units which comprise one or more data packets P1, P2, . . . Pm, . . . Pz. Each data packet P1, P2, . . . Pz is in this case transmitted in an associated time slot. The decision device 2 uses an already received part of the information unit to decide, before an information unit comprising one or more data packets P1, P2, . . . Pz has been completely received, whether the information unit is or is not important. By important, it is meant that the information unit contains information that should be processed further by the particular terminal T receiving the information unit or by other devices connected to the terminal T. If it is decided that the information unit is not important, the decision device 2 transmits a signal to the receiving device 1 to ignore the rest of the information unit. The receiving device 1 then terminates reception of the information unit. Depending on the structure and/or the information content of the data in the information unit and on its error rate, the receiving device 1 can determine whether or not the information unit is important after receiving a number of data packets P1, P2, . . . Pm, after receiving a single data packet P1, or even after receiving a just a part of the first data packet P1. If the decision device 2 determines that the information unit is not important, then it transmits a signal to the receiving device 1 indicating that the receiving device 1 should ignore the rest of the information unit. The rest of the information unit being for, example, the rest of the first data packet P1, the rest of the data packets P2 . . . Pz, or the rest of the data packets Pm . . . Pz, which have not yet been received. The signal to ignore the rest of the information unit can, for example, activate a switch or a gate which switches off or deactivates the receiving device 1 or changes it to a standby state.

An information unit including a plurality of data packets is transmitted, for example, like the signaling data in the GSM system, in a plurality of time frames following one another. In this case, one data packet is transmitted to the terminal T in each time frame. The terminal T may decide even after receiving the first data packet whether the information unit is or is not important. In particular, this is possible if the transmitted data has been subjected to redundant coding, which results in the doubling of the number of data bits in the information unit. Since, in this case, the first data packet contains twice the number of data bits, a relatively reliable statement can be made as to whether the entire information unit is or is not important, even after receiving just the first data packet.

If transmission errors occur on the transmission channel between the transmitter and the receiving terminal T, then additional data must be received in order to allow a reliable decision to be made. If, for example, signaling data to be transmitted contains four data packets, then, beyond a certain error rate, it is no longer possible to decide on the basis of a single data packet whether the signaling data is or is not important, and it is also necessary to receive the second data packet to allow a reliable decision to be made.

The receiving device 1 includes an equalizer which provides the soft-decision values of the received digital data. The soft-decision values provide information about the quality of the received digital data, that is to say they allow a probability assessment to be made whether the transmitted data has been transmitted correctly, or contains errors. The decision device 2 uses these soft-decision values of the already received parts of an information unit to calculate a probability value as to whether the information unit is or is not important. The decision device 2 in this case decides that the information unit is not important if the probability of this is sufficiently high, that is to say if the calculated probability value is above a predetermined probability threshold. This makes it possible to prevent incorrect classification of an information unit as a result of the incorrect transmission or reception of individual bits.

The present invention will be explained in the following text with reference to preferred exemplary embodiments, in this case referring to a terminal T which is operated in the GSM system, and with the information unit being transmitted in a transmission channel for signaling data. In this specific configuration, information units which are not important may be, for example, filling data which are transmitted from a base station to the mobile stations when there is no signaling data to be transmitted on the signaling channel. This is the case, for example, when no call is intended to be transmitted.

Information units which are not important may, however, also contain signaling data which does not relate to the terminal T. A base station uses the GSM system to transmit signaling data distributed over four data packets or time slots when a call needs to be transmitted to a mobile station. However, this signaling data is received by all of the accessible mobile stations. This signaling data signals to the relevant mobile station that a call is intended to be transmitted. In this case, the transmission of the signaling data lasts for about 15 ms, with each mobile station listening in or being activated every 0.5 to 2 s, in order to check whether it is being called. However, normally, the signaling data is intended for only a single mobile station, and the other mobile stations are not affected by this. An information unit which is not important thus contains, for example, signaling data which is intended for a different mobile station.

Information units may otherwise be not important because they contain data which the receiving terminal T, for example, in a mobile station has already received, and which it no longer requires. In the GSM system, these are, for example, call requests (paging requests) which are transmitted several times in succession in order to improve the probability of accessibility. The last case furthermore also relates to the BCCH data (Broadcast Control Channel), in which the configuration of the system is reported to the mobile station. Such data is transmitted in up to eight wanted data packets and normally rarely changes. However, the mobile station has to receive such data again every 30 seconds in the situation where the base station is reconfigured. Data such as this is thus also unimportant data for the purposes of the present invention, once the terminal T has received the data and provided it has not changed when transmitted again.

In a first preferred exemplary embodiment, the decision device 2 includes a memory 5 having previously stored information and an evaluation device 6 which evaluates the information content of the already received part of the information unit and compares this information content with the information stored in the memory 5 to determine whether the information unit is or is not important. The already received data and the previously stored information concerning the constant bits or relationships between individual bits thus allows those bits or relationships between bits to be evaluated, from which it is possible to determine whether the information unit is not important for the terminal T.

In this case, it is particularly worthwhile to consider in each case one specific fixed part of the data packet in which a specific type of data is always arranged, depending on a specific definition. If, for example in the GSM system, the first byte of a signaling data information unit contains information about the length of the information unit, then the evaluation device 6 evaluates this length information and compares it with permitted maximum and/or minimum length values which are stored in the memory 5. If the evaluated length of the information unit is too short to allow sensible information to be obtained or if it is longer than the maximum permitted length, then the rest of the information unit can be ignored.

However, the second byte of the data packet, which contains the message format in the GSM system, may also be considered. The evaluation device 6 then evaluates the message format of the received data and compares it with message format information stored in the memory 5, in order to find out whether the message format is of interest to the terminal T. If the evaluated data shows that the information unit contains a message which does not relate to the terminal T, then the rest of the information unit is ignored. Furthermore, header information defining the expected context in the transmitted data packet can also be investigated, for example layer 2 header, protocol descriptor, etc. The following text illustrates one example of an implementation in the GSM system for receiving a filling message in the call request channel (paging message) with the first two bytes representing the part of the filling message which has already been received. The known data is in this case underlined.

- - - 01 reserved bits owing to the compatibility with respect to Phase 1;
000101 - - - layer 2 length, where 5≧length≧22;
- - - 0110 protocol discriminator; and
0000 - - - skip indicator.

The bits described above are read from right to left, with the two bits in the first line with the value "1" and "0" having been defined as the coding format for Phase 1 of the GSM system, but no longer being required in Phase 2 of the GSM system. In order nevertheless to ensure compatibility between systems operated in Phase 1 and systems operated in Phase 2, these two bits will still continue to be transmitted in the indicated manner even in Phase 2 of the GSM system. The second line shows the six bits adjacent to the two in the first line, containing the length information for the layer 2 length. When analyzing the length information in the illustrated example, the underlined sixth bit with the "0" value is used to decide whether the message is or is not important. The two reserved bits shown in the first line, together with the six length bits shown in the second line thus produce the first byte of the already received part of the filling message. The next four bits shown in the third line are the protocol discriminator and are used to activate the corresponding layer in the mobile station. The last four bits in the second byte, shown in the fourth line, are not yet specified in Phase 2 of the GSM system, and are each reserved for upgrades in Phase 3 and Phase 4. If values other than the "0000" values illustrated occur here, the incoming information unit is ignored.

Since there are a very large number of known bits in the area around the layer 2 length, the layer 2 length can be determined with some remaining uncertainty by means of the coding used in the GSM system. The length is either 5, in which case the information unit can only be a filling message which is ignored by the terminal T or the mobile station, or the length is 23, which is an illegal length and the mobile station likewise ignores the information unit. If one or more of the bits which are identified here as being known has or have a value other than that shown here, the information unit is likewise identified by the mobile station as being invalid and is ignored.

The terminal T and the method in the first exemplary embodiment are particularly suitable for data which has been coded using a coding method in which the wanted bits influence only a certain relatively tightly localized portion of the transmitted coded bits. One example of this is the convolutional codes which are used in the GSM system and have an influence length of about 8, that is to say a wanted data bit influences about 8 coded bits. If the information unit is transmitted in four data packets, then of the eight influenced coded bits, two bits are thus transmitted in the first data packet. The relationship between these two bits then allows a conclusion to be drawn relating to the entire information unit.

In a second preferred exemplary embodiment, the decision device 2 includes a memory 5 having previously stored information and compares the already received part of the information unit with the information stored in the memory 5 to decide whether the information unit is or is not important.

In contrast with the first exemplary embodiment, the information content of the received data is not evaluated in this case.

For example, the memory 5 can be used to store a data packet or an information unit having dummy messages, which are always transmitted in a signaling channel by a base station when there is no signaling data to be transmitted. If the previously received part of the information unit matches the corresponding stored part of an expected information unit with dummy data, then it is assumed that the incoming information unit actually contains dummy data. The receiving device 1 then ignores the rest of the information unit and terminates reception.

Depending on the coding method, the assumption that an information unit having dummy data has actually arrived is theoretically not necessarily correct. However, if the probability that an information unit with dummy data is present is sufficiently high, then the procedure is sufficiently reliable. The method according to the second exemplary embodiment corresponds roughly to the comparison of checksums, even if the data being compared is not explicitly checksums. As a rule, the base stations in the GSM system always transmit identical dummy-data data packets. Therefore, he second exemplary embodiment can advantageously be applied to this field.

The terminal T and the method according to the second exemplary embodiment are particularly suitable for data which is coded using coding methods in which the wanted bits influence the transmitted coding bits over a very wide range. One example of this is the fire codes used in the GSM system, in which a checksum is used having an additional capability for error correction, and in which a wanted data bit influences up to 80 coded bits. However, other checksums may also be used in the second exemplary embodiment. Nonetheless, a precondition in the second exemplary embodiment is that the information previously stored in the memory 5 is completely known, that is to say completely specified.

In a third exemplary embodiment of the invention, the decision device 2 includes a memory 5 for temporary data storage, in which a part of a previously received information unit is stored. The decision device 2 compares the already received part of a current information unit with the part of the previously received information unit stored in the memory 5 to decide whether the current information unit is or is not important. This is advantageous when parts of the information unit or the entire information unit to be stored in the memory 5 is not defined from the start. Since, for example in the GSM system, the contents of filling data packets are not defined, parts of the filling data packets, or the entire filling data packets which have already been received are stored in the memory 5 for temporary data storage. This enables the consideration of changes in the filling data or dummy data, for example when changing a base station. As an alternative or in addition, other data packets may also be stored in the memory 5, which have previously been received and were not yet unimportant but have become unimportant since, for example, they are no longer required in the terminal T. In this manner, the repetitive reception of data which has already been received but is no longer relevant is avoided.

In a fourth exemplary embodiment of the invention, the already received part of the information unit contains information about whether the information unit is or is not important. In this case, the decision device 2 includes an evaluation unit, which evaluates this information. This exemplary embodiment is based on the idea of using the first portion of the coded bits of an information unit to make the nature of the information unit identifiable as such even in the first data packet. To do this, for example, dummy data packets and wanted data packets must be defined to be sufficiently different from one another or, possibly, additional data which is not required per se for signaling can be inserted, which is sufficiently different from the dummy data and wanted data packets such that the difference can be identified just from the first part of the information unit. Alternatively, further data may also be attached to the corresponding specified data, to allow a distinction to be drawn at this stage.

In the specific case of the GSM system, it would be possible to carry out the following upgrade. At the moment, the so-called stealing flags, which each make up two bits per data packet, are not used, inter alia, in the channel CCCH (Common Control Channel)s. The stealing flags are used exclusively in the FACCH (Fast Associated Control Channel) to distinguish between wanted data and signaling data, for example during a handover. Using the CCCH, the base station can use these stealing flags to signal whether wanted information or dummy or filling data are present. If, after receiving the first data packet, a terminal T detects one or both stealing flags, then the data packet does not need to be evaluated any further. This also eliminates the need to determine the other bits in this data packet. In the case of the BCCH data (Broadcast Control Channel), these bits are set when the information has changed within the last 30 seconds, that is to say when it must be read again by all the accessible terminals T and mobile stations.

If the terminal T has suitably fast data processing, the receiver can be switched off during the transmission of the rest of the data packet. The terminal T can even be switched off during reception of the first data packet, immediately after detecting one or both stealing flags in this data packet. This also relates to the first, the second and the third exemplary embodiments, in which the receiver can still be switched off during the transmission of the rest of the first data packet, even immediately after detecting an already received part of a first data packet of the information unit, by means of appropriately fast data processing. However, in all the exemplary embodiments, the evaluation of the rest of the first data packet can at least be ended as soon as the decision device 2 has made a decision on the already received part of the information unit and has assessed its importance. This saves a large amount of digital signal processing with the equalizer algorithm in the receiving device 1 and reduces the power consumption.

We claim:

1. A terminal for a mobile digital radio system, comprising:

a receiver for receiving an information unit including one or more data packets, at least one of the one or more data packets including soft-decision values, said receiver programmed to initially receive only a portion of the information unit;

a decision device programmed to use the soft-decision values to calculate a probability value indicative of whether it is important to receive an additional portion of the information unit, programmed to determine whether it is important to receive the additional portion of the information unit by comparing the probability value with a predetermined threshold, and programmed to provide a signal such that said receiver does not receive the additional portion of the information unit if it is determined that it is not important to receive the additional portion of the information unit.

2. The terminal for a mobile digital radio system according to claim 1, wherein said receiver and said decision device are configured to operate in a GSM system, said receiver is programmed for receiving the portion of the information unit from a transmission channel for signaling data, and the information unit includes unimportant data selected from the group consisting of filling data and signaling data that is not required by the terminal.

3. The terminal for a mobile digital radio system according to claim 1, comprising:

a memory for storing predetermined information, said memory forming part of said decision device; and an evaluator programmed to evaluate an information content of the portion of the information unit, said evaluator programmed to determine whether it is important to receive the additional portion of the information unit by comparing the information content of the portion of the information unit with the predetermined information.

4. The terminal for a mobile digital radio system according to claim 3, wherein:

the information unit has a length;

the portion of the information unit includes information about the actual length of the information unit;

said predetermined information includes a predetermined length value having information about a permitted length of the information unit; and said evaluation unit is programmed to compare the actual length of the information unit with the predetermined length value.

5. The terminal for a mobile digital radio system according to claim 3, wherein:

the information unit has a format;

the portion of the information unit includes information about the actual format of the information unit;

said predetermined information includes an expected format value having information about an expected format of the information unit; and said evaluation unit is programmed to compare the actual format of the information unit with the expected format value of the information unit.

6. The terminal for a mobile digital radio system according to claim 1, wherein said decision device includes a memory for storing predetermined information, said decision device is programmed to determine whether it is important to receive the additional portion of the information unit by comparing an information content of the portion of the information unit with the predetermined information.

7. The terminal for a mobile digital radio system according to claim 6, wherein the predetermined information includes information relating to an expected information unit that is not important.

8. The terminal for a mobile digital radio system according to claim 1, wherein said decision device includes a memory for temporarily storing a portion of a previously received information unit, and said decision device is programmed to determine whether it is important to receive the additional portion of the information unit by comparing the portion of the information unit with the portion of the previously received information unit.

9. The terminal for a mobile digital radio system according to claim 1, wherein:

the information unit includes importance information indicating whether the information unit is important; and said decision device includes an evaluator programmed to evaluate the importance information to determine whether it is important to receive the additional portion of the information unit.

10. The terminal for a mobile digital radio system according to claim 9, wherein:
    said receiver and said decision device are configured to operate in a GSM system;
    the information unit is assigned to a signaling channel other than an FACCH channel, the signaling channel includes stealing flags, and the information unit includes the stealing flags of the signaling channel.

11. A method for evaluating data for reception in a terminal of a mobile digital radio system, which comprises:
    providing an information unit that includes one or more data packets;
    providing at least one of the one or more data packets with soft decision values;
    receiving a portion of the information unit;
    calculating, using the soft decision values, a probability value indicative of whether it is important to receive an additional portion of the information unit; and
    determining whether it is important to receive the additional portion of the information unit by comparing the probability value with a predetermined threshold.

12. The method for evaluating data for reception according to claim 11, which comprises:
    providing the information unit with unimportant data selected from the group consisting of filling data and signaling data that is not required by the terminal;
    transmitting the information unit in a transmission channel for signaling data;
    providing a terminal and operating the terminal in a GSM system; and
    using the terminal to perform the receiving step by receiving the portion of the information unit from the transmission channel.

13. The method for evaluating data for reception according to claim 11, which comprises providing a terminal; and storing the predetermined threshold in the terminal.

14. A method for evaluating data for reception in a terminal of a mobile digital radio system, which comprises:
    providing a terminal;
    storing predetermined information in the terminal;
    providing an information unit that includes one or more data packets, and providing the information unit with an information content;
    receiving a portion of the information unit with the terminal and defining the portion of the information unit as a received portion of the information unit;
    obtaining the information content of the received portion of the information unit; and
    determining whether it is important to receive an additional portion of the information unit by comparing the information content of the received portion of the information unit with the predetermined information.

15. The method for evaluating data for reception according to claim 14, which comprises:
    performing the storing step by storing a predetermined length value having information about a permitted length of the information unit;
    providing the information unit with a length;
    performing the obtaining step by obtaining the length of the information unit from the received portion of the information unit; and
    performing the determination step by comparing the obtained length with the predetermined length value.

16. The method for evaluating data for reception according to claim 14, which comprises:
    performing the storing step by storing an expected format value having information about an expected format of the information unit;
    providing the information unit with a format;
    performing the obtaining step by obtaining the format of the information unit from the received portion of the information unit; and
    performing the determination step by comparing the obtained format with the expected format value.

17. The method for evaluating data for reception according to claim 14, which comprises:
    performing the storing step by storing an expected format value having information about an expected format of a non-important information unit;
    providing the information unit with a format;
    performing the obtaining step by obtaining the format of the information unit from the received portion of the information unit; and
    performing the determination step by comparing the obtained format with the expected format value.

18. The method for evaluating data for reception according to claim 14, wherein the predetermined information is a portion of a previously received information unit.

19. A method for evaluating data for reception in a terminal of a mobile digital radio system, which comprises:
    providing an information unit that includes one or more data packets, and providing the information unit with a portion having information relating to whether the information unit is important;
    receiving the portion of the information unit having information relating to whether the information unit is important; and
    determining whether it is desirable to receive an additional portion of the information unit by evaluating the received information relating to whether the information unit is important.

20. The method for evaluating data for reception according to claim 19, which comprises:
    assigning the information unit to a signaling channel other than an FACCH channel;
    providing the signaling channel with stealing flags;
    providing the stealing flags of the signaling channel as the portion of the information unit having information relating to whether the information unit is important;
    providing a terminal operated in a GSM system; and
    using the terminal to perform the receiving step by receiving the portion of the information unit.

* * * * *